(12) United States Patent
Christensen et al.

(10) Patent No.: US 12,012,205 B2
(45) Date of Patent: Jun. 18, 2024

(54) AUTOMATIC ROTOR TILT CONTROL

(71) Applicant: Textron Innovations Inc., Providence, RI (US)

(72) Inventors: Kevin Thomas Christensen, Plano, TX (US); Sang Gyun Park, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 75 days.

(21) Appl. No.: 17/561,195

(22) Filed: Dec. 23, 2021

(65) Prior Publication Data

US 2023/0202651 A1 Jun. 29, 2023

(51) Int. Cl.
*B64C 29/00* (2006.01)
*B64C 13/18* (2006.01)
*B64C 13/22* (2006.01)

(52) U.S. Cl.
CPC .......... *B64C 29/0033* (2013.01); *B64C 13/18* (2013.01); *B64C 13/22* (2013.01)

(58) Field of Classification Search
CPC ................................................ B64C 29/0033
See application file for complete search history.

(56) References Cited

U.S. PATENT DOCUMENTS

| | | |
|---|---|---|
| 6,644,588 B2 | 11/2003 | King et al. |
| 10,338,606 B2 | 7/2019 | Builta |
| 2009/0114764 A1 | 5/2009 | Builta et al. |
| 2010/0301168 A1* | 12/2010 | Raposo ............... G05D 1/0858 244/171.2 |
| 2018/0229837 A1* | 8/2018 | Kimchi ............... B64C 29/0075 |
| 2019/0009901 A1* | 1/2019 | Luo ....................... B64C 27/26 |
| 2019/0031335 A1* | 1/2019 | McCullough ....... B64C 29/0033 |
| 2019/0225322 A1* | 7/2019 | Atkins .................... B64C 13/16 |
| 2020/0180761 A1* | 6/2020 | Sloan ..................... B64U 30/10 |
| 2020/0301446 A1* | 9/2020 | Leong .................... G05D 1/08 |
| 2021/0253234 A1* | 8/2021 | Tao ..................... B64C 29/0025 |

* cited by examiner

*Primary Examiner* — Tien Q Dinh
*Assistant Examiner* — William L Gmoser
(74) *Attorney, Agent, or Firm* — Fogarty LLP

(57) ABSTRACT

A flight control computer (FCC) may implement automatic rotor tilt control by gathering or receiving, as inputs, airspeed or a commanded airspeed for the aircraft, acceleration or a commanded acceleration for the aircraft, pitch attitude of the aircraft and pilot pitch bias commands for the aircraft, a rotor tilt angle, and/or the like. The FCC calculates, from the airspeed, the commanded airspeed, the acceleration, the commanded acceleration, the pitch attitude, the pilot pitch bias commands, and/or the like, a commanded rotor tilt angle for the aircraft. From the aircraft rotor tilt angle and the commanded rotor tilt angle, the FCC calculates a rotor tilt angle error for the aircraft, and from the rotor tilt angle error, calculates a rotor tilt rate command for the aircraft. The FCC outputs the resulting rotor tilt rate command to (an) aircraft flight control element actuator(s) to tilt the aircraft rotor.

19 Claims, 6 Drawing Sheets

AUTOMATIC ROTOR TILT CONTROL

STATEMENT REGARDING FEDERALLY SPONSORED RESEARCH OR DEVELOPMENT

This invention was made with U.S. Government support under Agreement No. W9124P-19-9-0001 awarded by the Army Contracting Command-Redstone Arsenal to the AMTC and a related AMTC Project Agreement 19-08-006 with Bell Textron Inc. The Government has certain rights in the invention.

TECHNICAL FIELD

The present disclosure relates generally to aircraft, more particularly to rotorcraft; and specifically, to automatic rotor tilt control.

BACKGROUND

Tiltrotor aircraft are hybrids between traditional helicopters and traditional propeller driven aircraft. Typical tiltrotor aircraft have fixed wings that terminate with convertible tiltrotor assemblies that house the transmissions that drive the rotors, and also the engines in some applications. Tiltrotor aircraft are convertible from a vertical take-off and landing (VTOL) or helicopter mode, in which the tiltrotor aircraft can take-off, hover, and land like a helicopter, to a cruise or airplane mode, in which the tiltrotor aircraft can fly forward like a fixed-wing aircraft.

The design of tiltrotor aircraft poses unique problems not associated with either helicopters or propeller driven aircraft. In particular, manual operation of the rotor tilt angle controller typically includes leveling the flight deck during hover operations (VTOL mode), accelerating through the conversion corridor, capturing a specific tilt angle in the conversion corridor, adjusting rotor speed with rotor tilt on the downstop (cruise mode), and bringing rotor tilt off the downstop to aid in deceleration. Such manual operation of the rotor tilt angle controller can contribute significantly to increased pilot workload.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide automatic rotor tilt control for a tiltrotor aircraft, or the like. Such systems and methods include or employ an aircraft flight control system, which may include one or more aircraft flight control computers (FCC(s)). The FCC(s) gather or receive, as inputs, airspeed of an aircraft or a commanded airspeed for the aircraft, acceleration of the aircraft or a commanded acceleration for the aircraft, pitch attitude of the aircraft and pilot pitch bias commands for the aircraft, an aircraft rotor tilt angle, and/or the like. The FCC(s) calculates, from one or more of the airspeed of the aircraft, the commanded airspeed for the aircraft, the acceleration of the aircraft, the commanded acceleration for the aircraft, the pitch attitude of the aircraft, the pilot pitch bias commands for the aircraft, and/or the like, a commanded rotor tilt angle for the aircraft. From the aircraft rotor tilt angle, the commanded rotor tilt angle, and/or the like, the FCC(s) calculate a rotor tilt angle error for the aircraft, and from the rotor tilt angle error, or the like, calculate a rotor tilt rate command for the aircraft. The FCC(s) then output the rotor tilt rate command, and/or the like, to one or more aircraft flight control element actuators, and/or the like, to tilt the aircraft rotor, accordingly.

In some aspects, the aircraft FCC(s) may use aircraft mode logic to select as inputs from the airspeed of the aircraft or the commanded airspeed for the aircraft, the acceleration of the aircraft or the commanded acceleration for the aircraft, and/or the pitch attitude of the aircraft and the pilot pitch bias commands for the aircraft. For example, where the aircraft is a tiltrotor aircraft and the mode is a vertical take-off and landing (VTOL) mode, conversion mode, or a cruise mode and the inputs selected in VTOL mode may be airspeed of the aircraft or the commanded airspeed for the aircraft and acceleration of the aircraft or a commanded acceleration for the aircraft, pitch attitude of the aircraft and pilot pitch bias commands for the aircraft. Whereas, the inputs selected in cruise mode may be airspeed of the aircraft or the commanded airspeed for the aircraft and acceleration of the aircraft or a commanded acceleration for the aircraft. In particular, where the mode is the VTOL mode, the pitch attitude may be used to calculate the commanded rotor tilt angle to maintain a deck of the aircraft level during hover. However, in any mode, VTOL mode, conversion mode, or cruise mode, the airspeed or commanded speed, acceleration of the aircraft or the commanded acceleration for the aircraft may be used to calculate the commanded rotor tilt angle.

In various aspects, the aircraft FCC(s) may determine if the commanded rotor tilt angle and/or tilt rate command is below a threshold and insert a deadband in the commanded rotor tilt angle and/or tilt rate to zero out tilt rate command in response to the commanded rotor tilt angle and/or tilt rate command being below the threshold. Also, or alternatively, the aircraft FCC(s) may determine if the commanded rotor tilt angle is within a threshold of a predetermined discrete tilt angle during unaccelerated flight and command the rotor tilt angle to the predetermined discrete tilt angle in response to the commanded rotor tilt angle being within the threshold of the predetermined discrete tilt angle during unaccelerated flight.

In various embodiments, one or more of the techniques described herein may be performed by one or more computer systems (e.g., an FCC). In other various embodiments, a tangible computer-readable storage medium may have program instructions stored thereon that, upon execution by one or more computer systems (e.g., an FCC) cause the one or more computer systems to execute one or more operations disclosed herein. In yet other various embodiments, one or more systems (e.g., an FCC) may each include at least one processor and memory coupled to the processors, wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
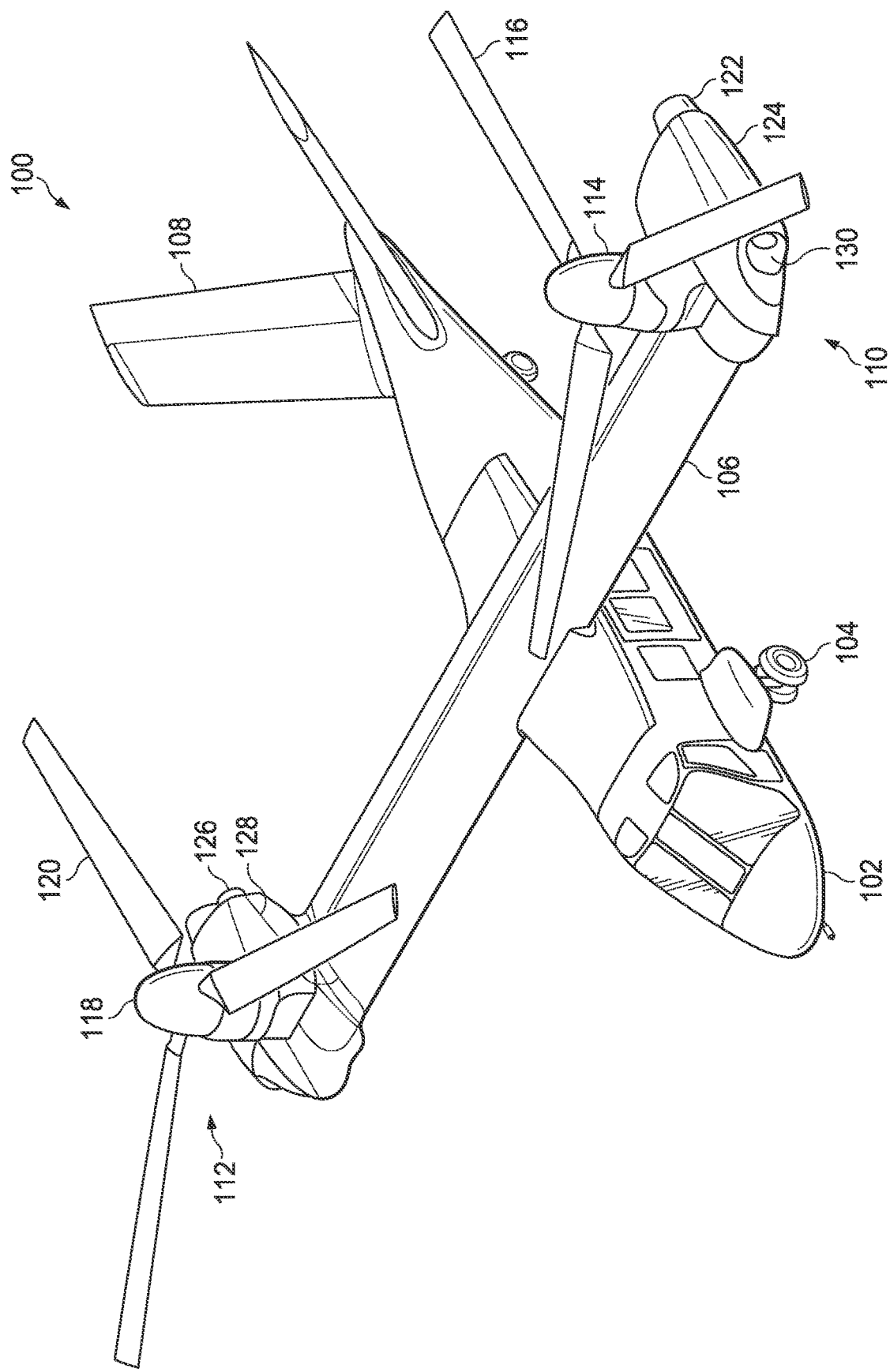

Having thus described the invention in general terms, reference will now be made to the accompanying drawings, which are not necessarily drawn to scale, and which are incorporated in and form part of the specification and in which like numerals designate like parts, illustrate embodiments of the present invention and together with the description, serve to explain the principles of the invention. In the drawings:

FIG. 1 is a perspective view of an example tiltrotor aircraft configured in a vertical take-off and landing (VTOL) (or helicopter) mode.

Figure 2:
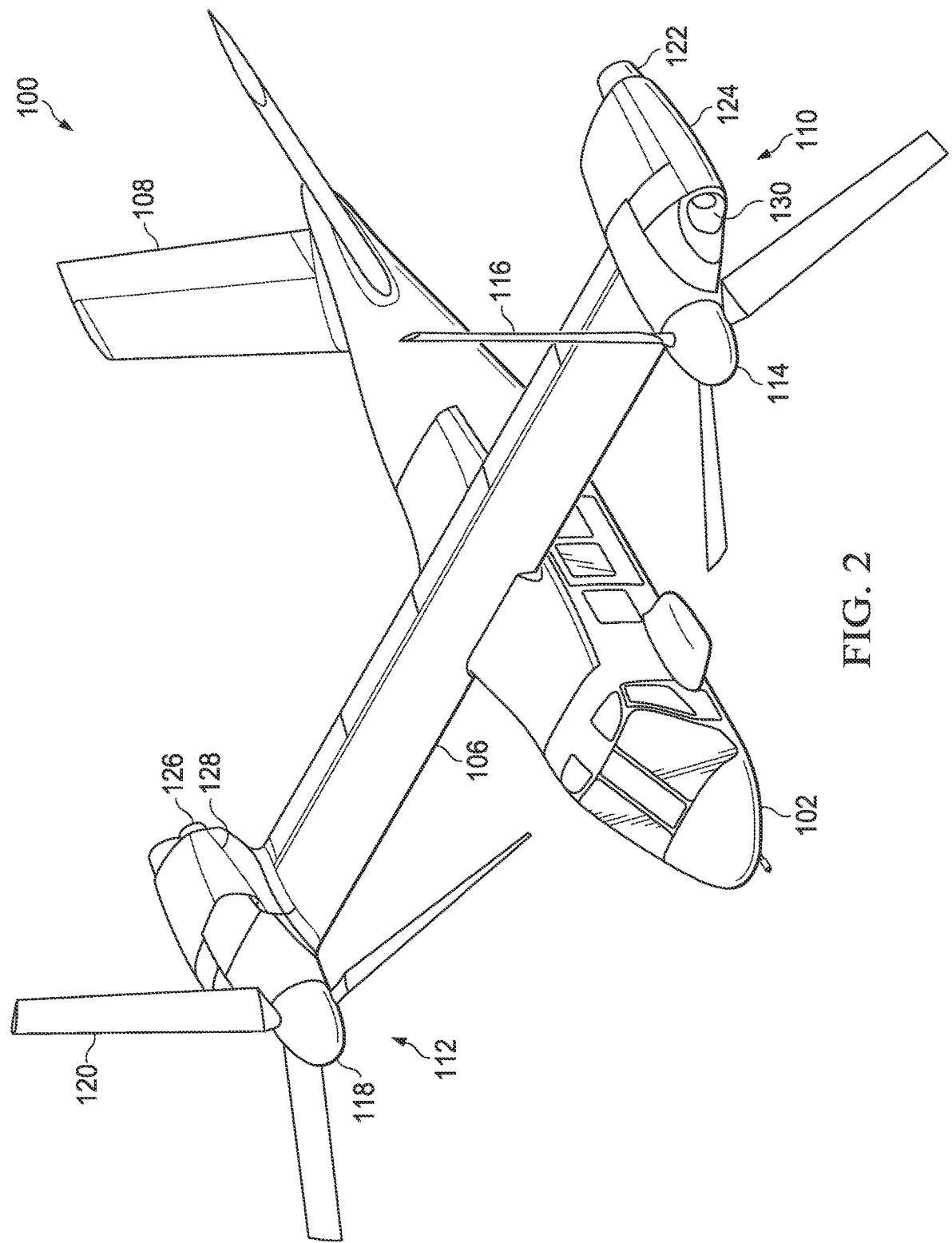

FIG. 2 is a perspective view of the example tiltrotor aircraft of FIG. 1 configured in a cruise (or airplane) mode.

Figure 3:
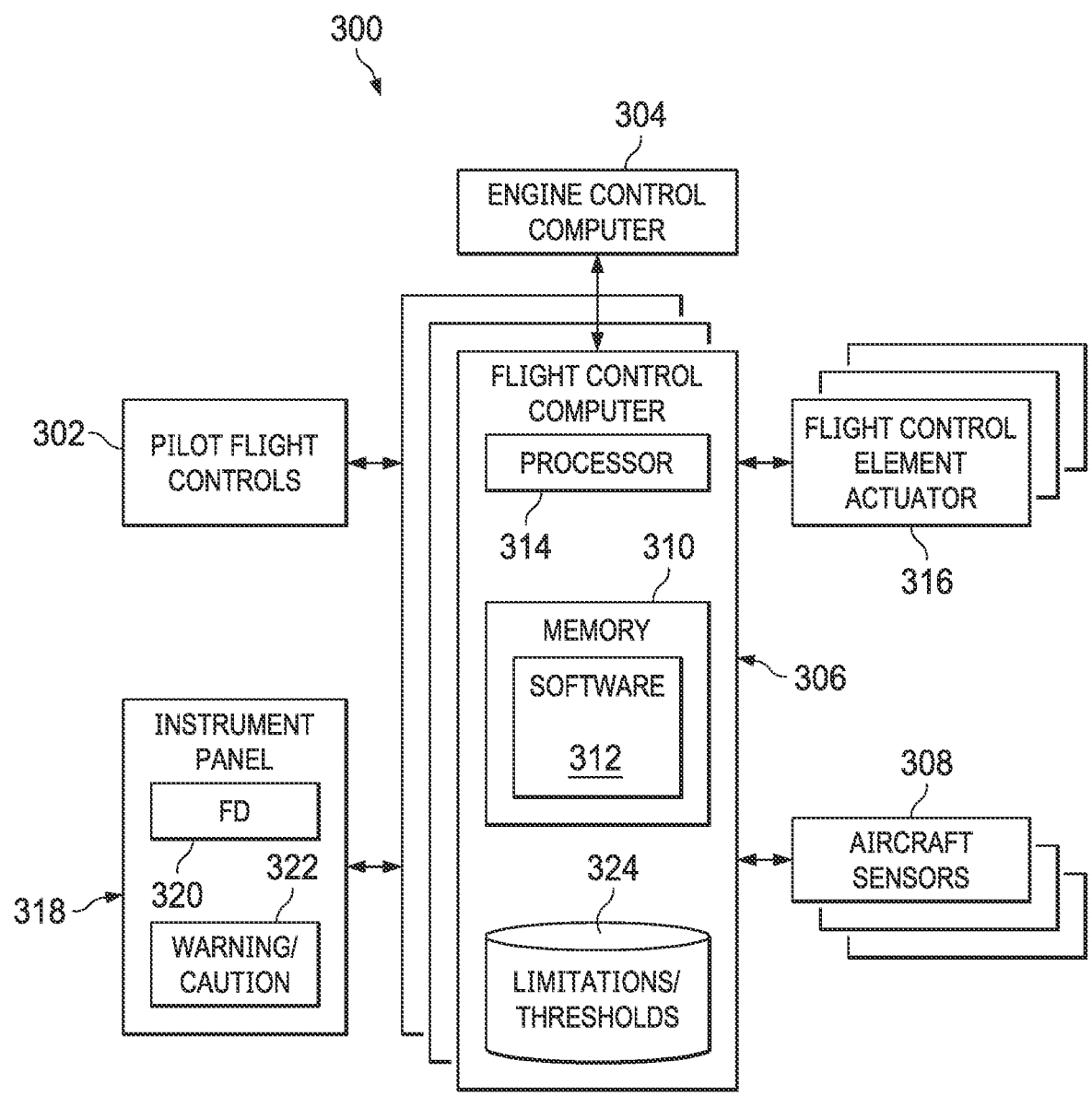

FIG. 3 is a block diagram of an example fly-by-wire flight control system 300 for an aircraft, such as may implement the present systems and methods for automatic rotor tilt control, according to some embodiments.

Figure 4:
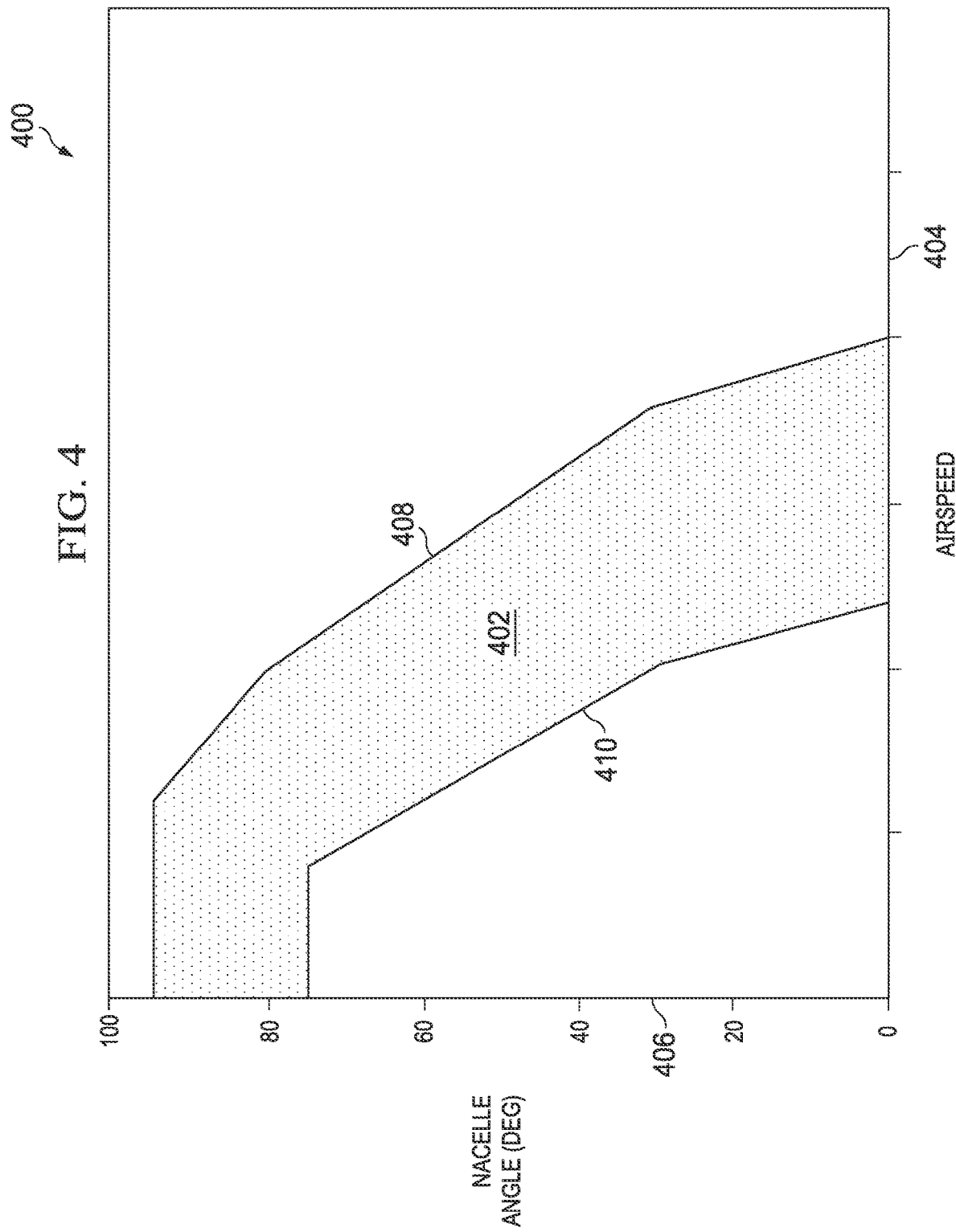

FIG. 4 is a graph of a notional tiltrotor conversion corridor, such as in which embodiments of the present systems and methods for automatic rotor tilt control may be implemented.

Figure 5:
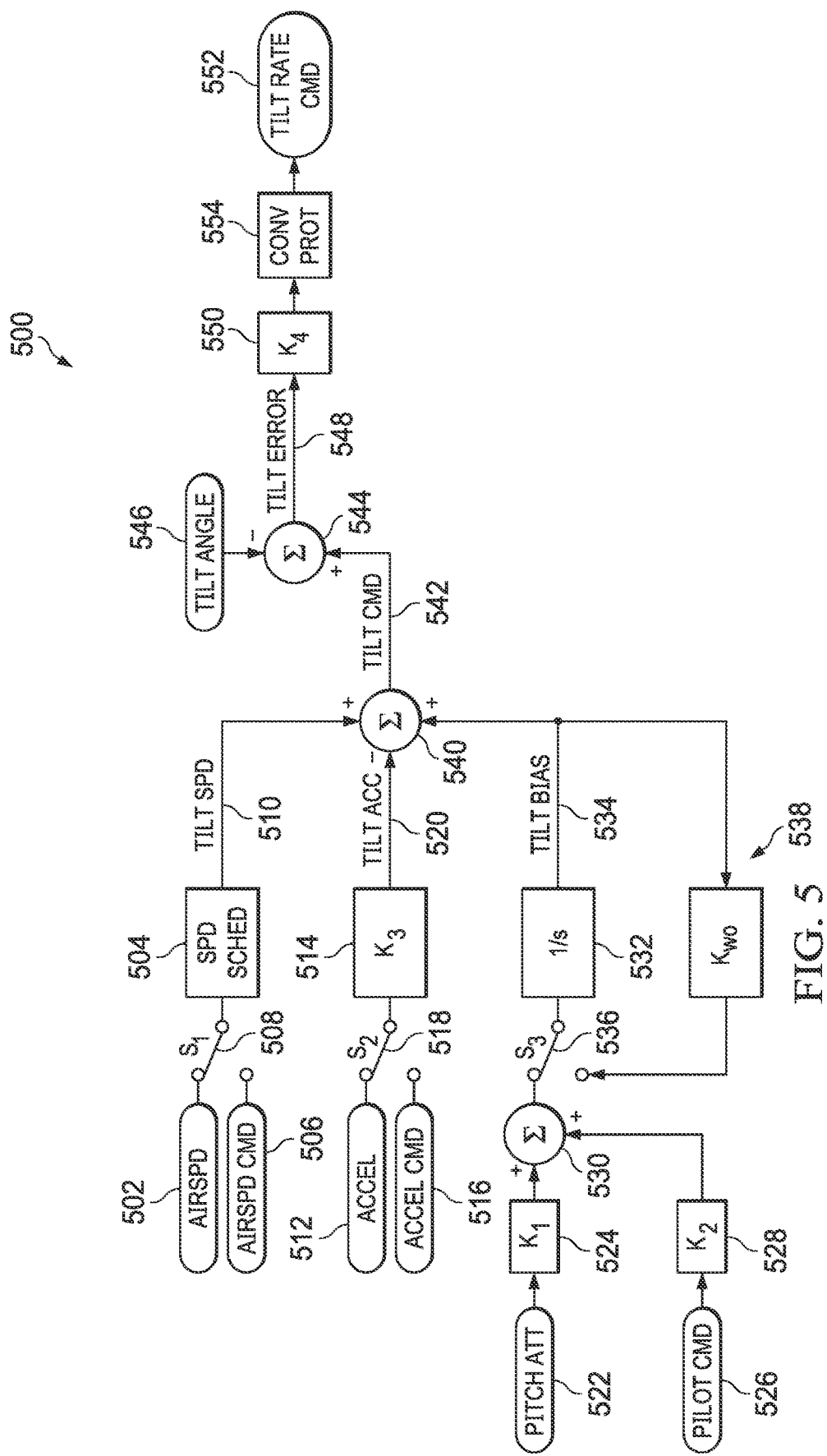

FIG. 5 is a block diagram illustrating an example of automatic rotor tilt control, according to some embodiments.

Figure 6:
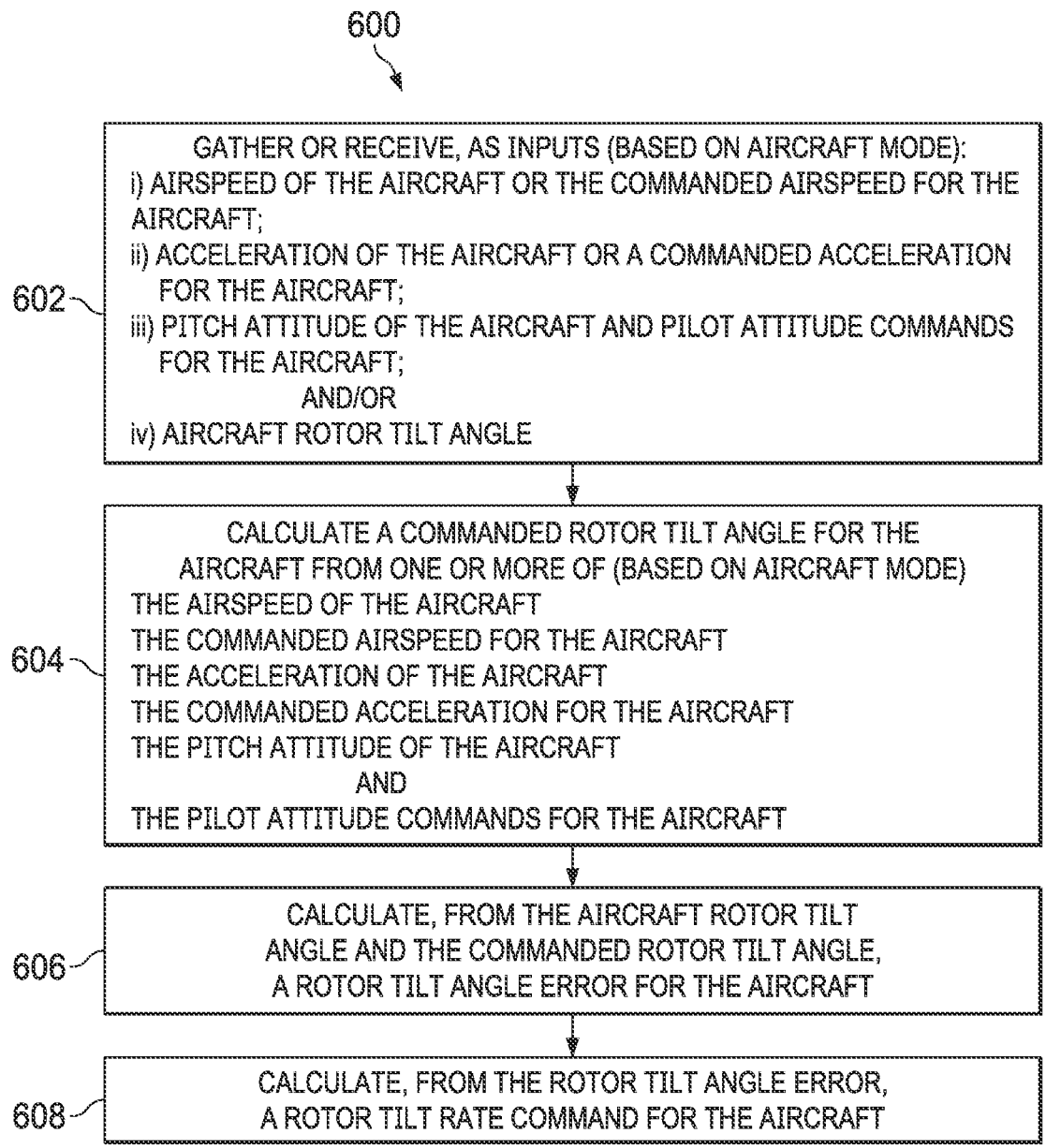

FIG. 6 is a flowchart of an example of automatic rotor tilt control, according to some embodiments of the present systems and methods.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention. For example, embodiments of the present systems and methods are directed to rotorcraft and specifically to automatic rotor tilt control. Therefore, although embodiments of the present systems and methods may be described below with reference to tiltrotor aircraft, embodiments of the present systems and methods may be applicable to various types of rotorcraft (e.g., electric vertical take-off and landing (eVTOL) aircraft, tiltrotor aircraft, etc.) that employ tilting rotor devices and/or any aircraft which tilts thrust producing devices to control the pitch and speed of the aircraft (e.g., tiltwings, tilt fans, tilt ducts, tilt propellers, etc.).

In various tiltrotor aircraft pylons (or nacelles) may follow automatic predefined speed schedules for rotor tilt control, use discrete gate control for rotor tilt control, and the like. Embodiments of the present systems and methods address increased pilot workload due to manual operation of the rotor tilt angle controller in a tiltrotor aircraft or other rotorcraft employing rotor tilt. When engaged, the present systems and methods for automatic rotor tilt control will relieve pilot workload by automatically controlling rotor tilt angle. Embodiments of the present systems and methods use aircraft mode logic to select inputs, including airspeed or commanded airspeed, acceleration or commanded acceleration, pitch attitude, and manual pilot tilt commands, to compute a commanded tilt angle. The resulting tilt angle error is used to compute a tilt rate command.

In accordance with embodiments of the present systems and methods, a flight control computer (FCC) may implement automatic rotor tilt control by gathering or receiving, as inputs, airspeed or a commanded airspeed for the aircraft, acceleration or a commanded acceleration for the aircraft, pitch attitude of the aircraft and pilot pitch bias commands for the aircraft, a rotor tilt angle, and/or the like. The FCC calculates, from the airspeed, the commanded airspeed, the acceleration, the commanded acceleration, the pitch attitude, the pilot pitch bias commands, and/or the like, a commanded rotor tilt angle for the aircraft. From the aircraft rotor tilt angle, the commanded rotor tilt angle, and/or the like, the FCC calculates a rotor tilt angle error for the aircraft, and from the rotor tilt angle error, or the like, calculates a rotor tilt rate command for the aircraft. The FCC outputs the resulting rotor tilt rate command, and/or the like, to (an) aircraft flight control element actuator(s), and/or the like, to tilt the aircraft rotor.

FIG. 1 is a perspective view of example tiltrotor aircraft 100 configured in a vertical take-off and landing (VTOL) (helicopter) flight mode, and FIG. 2 is a perspective view of example tiltrotor aircraft 100 configured in a cruise (airplane) mode. Tiltrotor aircraft 100 includes a fuselage 102, a landing gear 104, a wing 106, a tail member 108, and propulsion systems 110 and 112. The fuselage 102 is the main body of the tiltrotor aircraft 100, which may include a cabin (e.g., for crew, passengers, and/or cargo) and/or may house certain mechanical and electrical components for tiltrotor aircraft 100. In the illustrated embodiment, tail member 108 may be used as a vertical and a horizontal stabilizer.

Propulsion system 110 includes a proprotor 114 that includes a plurality of rotor blades 116. Propulsion system 112 includes a proprotor 118 that includes a plurality of rotor blades 120. The position of proprotors 114 and 118, as well as the pitch of rotor blades 116 and 120, can be selectively controlled in order to provide flight capabilities (e.g., flight direction, thrust, and/or lift) for tiltrotor aircraft 100. Various engines, gearboxes, and driveshafts may be provided in various configurations to provide torque to proprotors 114 and 118. For example, in at least one embodiment, propulsion system 110 may include an engine 122 within an engine nacelle 124. Engine 122 is mechanically coupled to a proprotor gearbox (PRGB), or the like, such as via a fixed gearbox to provide torque to proprotor 114 to facilitate various flight capabilities. Likewise, propulsion system 112 may include an engine 126 within an engine nacelle 128, also mechanically coupled to a proprotor gearbox (PRGB), or the like, such as via a fixed gearbox to provide torque to proprotor 118 to facilitate the various flight capabilities. In various embodiments, engine nacelles 124 and 128 may include an inlet (e.g., 130), aerodynamic fairings, and exhaust, as well as other structures and systems to support and facilitate the operation of engine 122 and 126, respectively.

The position of proprotors 114 and 118 are moveable between a VTOL (helicopter) mode position and a cruise (airplane) mode position to provide different types of thrust for tiltrotor aircraft 100. FIG. 1 illustrates tiltrotor aircraft 100 proprotors 114 and 118 in a VTOL mode position in which proprotors 114 and 118 are positioned substantially vertical to provide a lifting thrust. FIG. 2 illustrates tiltrotor aircraft 100 in a cruise mode position in which proprotors 114 and 118 are positioned substantially horizontal to provide forward thrust, and in which lift is supplied by wing 106. It should be appreciated that tiltrotor aircraft can be operated such that proprotors 114 and 118 can be selectively positioned between cruise mode and VTOL mode positions, which can be referred to as a "conversion mode."

Propulsion systems 110 and 112 are illustrated in the context of tiltrotor aircraft 100, however, propulsion systems 110 and 112 can be implemented on other tiltrotor aircraft. For example, an alternative embodiment may include a quad tiltrotor that has an additional wing member aft of wing 106 and the additional wing member may have additional propulsion systems similar to propulsion systems 110 and 112. In another embodiment, propulsion systems 110 and 112 can be used with an unmanned version of tiltrotor aircraft 100. Further, propulsion systems 110 and 112 can be integrated into a variety of tiltrotor aircraft configurations. Furthermore, embodiments of the present systems and methods may be applied to any application which tilts a rotating thrust device, such as a rotor mast, ducted fan, tilting propeller. That is, as noted, embodiments of the present systems and methods may be implemented in various types of rotorcraft (e.g., tiltrotor aircraft, eVTOL aircraft, etc.) that employs a tilting rotor device.

Illustrated propulsion systems 110 and 112 make use of tilting "pylons" (proprotors 114 and 118 and any associated driveshaft(s) and/or gearbox(es)) and fixed engine nacelles (124 and 128). In other tiltrotor aircraft the entire propulsion systems (i.e., proprotors, engine nacelles, with engines, as well as any associated driveshaft(s), gearbox(es) or the like) may tilt. In such tiltrotor aircraft these tilting propulsion systems may be simply referred to as "nacelles." Below, embodiments of the present systems and methods are described with reference to automatic tilt control of rotors or "pylons," such as illustrated in FIGS. 1 and 2. However, embodiments of the present systems and methods are equally applicable to automatic tilt control of such "nacelles," as well as, as mentioned, various other types of rotorcraft, eVTOL aircraft, etc., that employ tilting rotor devices.

FIG. 3 is a block diagram of example fly-by-wire flight control system for an aircraft (e.g., tiltrotor aircraft 100 of FIGS. 1 and 2), such as may implement the present systems and methods for automatic rotor tilt control, according to some embodiments. Alternatively, embodiments of the present systems and methods may make use of a similarly configured fly-by-light flight control system. A pilot may manipulate one or more pilot flight controls 302 in order to control flight of the aircraft. Example fly-by-wire flight control system 300 of FIG. 3 shows flight controls 302, which may variously be referred to as "inceptors," for a tiltrotor aircraft, rotorcraft, or the like, which may include manual controls (e.g., a control stick, a thrust inceptor, a pylon (nacelle) tilt thumbwheel or switch (on the thrust inceptor) etc.). However, as noted, various embodiments of the present systems and methods for automatic rotor tilt control may be implemented, not only in tiltrotor aircraft, including eVTOL aircraft, but also in rotorcraft that employ any tilting thrust device, or the like. Inputs provided by the pilot, to pilot flight controls 302, may be transmitted mechanically and/or electronically (e.g., via the fly-by-wire flight control system) to flight control elements (effectors) by flight control system 300. Flight control elements may represent devices operable to change the flight characteristics of the aircraft. Flight control elements on the aircraft may include mechanical and/or electrical systems operable to change the positions or angle of attack of rotor blades in a tiltrotor, or other rotorcraft, or lift surfaces for a tiltrotor aircraft during cruise (airplane) mode flight, or to change the power output of aircraft engine(s), for example. Flight control elements include systems such as a swashplate, pylon (nacelle) tilt angle, and the like in a tiltrotor aircraft in VTOL (helicopter) mode, and flaps, ailerons, rudder, elevators, trim tabs, and the like in cruise and/or conversion modes, and systems operable to control the aircraft engine(s) in accordance with each flight mode.

Flight control system 300 may adjust the flight control elements independently of the flight crew in order to stabilize the aircraft, reduce workload of the flight crew, and the like. Flight control system 300 includes engine control computers (ECCUs) 304, FCC(s) 306, and aircraft sensors 308, which collectively adjust the flight control elements, and may implement portions of embodiments of the present automatic rotor tilt control.

Flight control system 300 has one or more FCC(s) 306. In some embodiments, multiple FCC(s) 306 are provided for redundancy, modes of operation, and/or the like. One or more modules within FCC(s) 306 may be partially or wholly embodied as software and/or hardware for performing any functionality described herein. For example, FCC(s) 306 may comprise memory 310, including non-transitory medium for storing software 312, and one or more processors 314 for executing instructions of software 312. Memory 310 in some embodiments is a memory system that includes both transitory memory such as Random-Access Memory (RAM) and non-transitory memory such as, Read-Only Memory (ROM), Electrically Erasable Programmable ROM (EEPROM), Flash-EEPROM, magnetic media including disk drives, optical media, etc. Memory 310 stores software 312 as machine readable instructions executable by processor(s) 314. FCC 306 is configured to control aircraft effectors in response to aircraft control laws ("CLAWs"). Memory 310 stores instructions for executing the aircraft CLAWs. In accordance with some embodiments of the present systems and methods, memory 310 may be configured to store program instructions executable by the at least one processor. Such program instructions may include FCC operating system and/or the like adapting the FCC for use herewith.

ECCUs 304 control the aircraft engine(s). For example, ECCUs 304 may vary the output power of the aircraft engines (122, 126) to control the rotational speed of the rotors (116, 120), in the illustrated rotorcraft example of FIG. 3. ECCUs 304 may control the output power of the engine(s) according to commands from FCC(s) 306, or may do so based on feedback such a measured revolutions per minute (RPM) of the proprotors (114, 118).

FCC(s) 306 may analyze pilot inputs and dispatch corresponding commands to flight control elements such as ECCUs 304, aircraft flight control element actuators 316, for example, a conversion actuator configured to move the proprotor between a horizontal position and vertical position, actuators for a swashplate (in VTOL mode), actuators for control surfaces (in cruise mode), or the like, or other components used to control operation of the aircraft. Therethrough, FCC(s) 306 may implement embodiments of the present systems and methods for automatic rotor tilt control. Further, FCC(s) 306 are configured and receive input commands from the pilot controls through sensors associated with each of the pilot flight controls (302). The input commands are received by measuring the positions of pilot controls 302. FCC(s) 306 also display information in instruments on, for example, an instrument panel 318 and control tactile cueing commands to pilot controls 302.

In some embodiments, pilot flight controls 302 may include a control stick, which may be a single control stick (inceptor) that moves along two axes and permits a pilot to control pitch, which is the vertical angle of the nose of the rotorcraft and roll, which is the side-to-side angle of the rotorcraft. The control stick provides roll and pitch signals that are sent to FCC(s) 306, which controls swashplate(s), the engine(s), and/or (other) related flight control effectors. Likewise, the thrust inceptor may be a single control lever (inceptor) that moves along a single axis, or with a lever type action, to provide signals to the FCC(s) 306 to control the aircraft engine(s), swashplate actuators, or related flight control effectors. Pedals may provide signals to the FCC(s) 306 to control swashplates and/or an aircraft rudder, to cause the aircraft to yaw, or rotate around a vertical axis. Depending upon the type and model of the aircraft, the aircraft may have other flight control input apparatuses to provide pilot input to the flight control system, for example, a 3-axis sidestick controller (inceptor). However, in such aircraft, the 3-axis controller (inceptor) may also incorporate yaw control commonly operated by foot pedals.

In various embodiments, a grip of the thrust inceptor may include a pylon (nacelle) control thumbwheel or lever. This thumbwheel or lever may be spring biased in a selected position, but may be rotated by the pilot in a forward direction, or in an aft direction to lower or raise the pylon (nacelle) tilt angle in discrete steps. Alternatively, in other embodiments, the thumbwheel or lever may be used to change the pylon tilt angle freely, in non-discrete angles, with pylon rate proportional to the displacement of the thumbwheel or lever.

Aircraft sensors 308 are in communication with FCC(s) 306. Aircraft sensors 308 may include sensors for measuring a variety of aircraft systems, flight parameters, environmental conditions, and the like. For example, aircraft sensors 308 may include sensors for measuring yaw rate, ground speed, airspeed, altitude, attitude, position, orientation, temperature, airspeed, vertical speed, and the like. Thereby, sensors 308, such as in conjunction with FCC(s) 306, may determine aircraft operational limits such as stall, load factors, crosswind limits, vortex ring state (in VTOL mode), critical azimuth, drive system range limits, engine limits, and/or the like, in accordance with embodiments of the present systems and methods, as discussed in greater detail below. Other aircraft sensors 308 could include sensors relying upon data or signals originating external to the aircraft, such as a global positioning system (GPS) sensor, a VHF Omnidirectional Range sensor, Instrument Landing System (ILS), and the like. In some cases, some aircraft sensors 308 are part of or connected to a Flight Director (FD) 320.

In some embodiments, instrument panel 318 includes a flight management system (FMS). The FMS may include a GPS, a mapping system, a navigation system, or other types of systems. FD 320 may further include a display that can be used to provide information to the pilot. In some embodiments, FD 320 may be configured to send signals representing flight control targets to FCC(s) 306, and may be configured to receive coupling logic signals from FCC(s) 306. FD 320 and FCC(s) 306 may be able to send or receive other signals, such as sensor signals, target error signals, command signals, or other types of signals. In some embodiments, FD 320 is communicatively coupled to the FCC(s) by a communications bus such as a serial bus, a CAN bus, or another type of wired or wireless communication system. In some embodiments, FD 320 includes an autopilot function that provides automatic flight control for the aircraft.

Instrument panel 318 may also provide warning, caution, and advisory indications 322 to the pilot. Warning and caution indications 318 may include, for example, text alerts on a display, lights (e.g., master caution and fire lights), an annunciator panel, aural warnings (e.g., bells, chimes, and tones), spoken warnings, and other indicators. Other warning, caution, and advisory indications provided to the pilot may include tactile feedback, such as, stick, yoke, thrust inceptor, or pedal shakers, detents, and other indicators. FCC(s) 306 may determine that the aircraft is approaching or in an unsafe condition and may trigger an appropriate warning or caution indicator 322, or tactile feedback, to notify the pilot of that condition. For example, FCC(s) 306 may monitor database 324 that may include certain aircraft performance limitations, thresholds and the like. When an aircraft status or flight condition reaches or approaches a limitation or threshold in database 324, FCC(s) 306 can provide an indication to the pilot via warnings and cautions 322, and/or provide tactile feedback to alert the pilot of that condition.

A person of skill in the art will appreciate that fly-by-wire flight control system 300 is merely illustrative and is not intended to limit the scope of the disclosure described herein. In particular, the fly-by-wire flight control system 300 may include any combination of hardware and/or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other flight system configurations.

For example, FCC components may include programing and/or hardware to implement embodiments of the present systems and methods. This programming may take the form of stored program instructions, programed firmware, or the like, while hardware might take the form of an Application Specific Integrated Circuit (ASIC), or the like, to carry out such aspects of embodiments of the present systems and methods. A person of ordinary skill in the art will appreciate that FCC(s) is merely illustrative and is not intended to limit the scope of the disclosure described herein. In particular, the FCC(s) may include any combination of hardware or software that can perform the indicated operations.

FIG. 4 is graph 400 of notional tiltrotor conversion corridor 402, such as in which embodiments of the present systems and methods for automatic rotor tilt control may be implemented. Graph 400 has horizontal axis 404, which represents airspeed in knots and vertical axis 406, which represents nacelle or pylon angle in degrees as illustrated. Operational conversion corridor 402 in graph 400 represents the safe operating envelope in which a corresponding tiltrotor aircraft (100) may be operated. Operational conversion corridor 402 may be defined and predetermined in the structural design criteria of the aircraft. Nacelle or pylon control incorporated into the aircraft's flight control system (300) protects the pilot from operating the aircraft outside of operational conversion corridor 402. For example, in various embodiments, pylon (nacelle) rotation rate may be automatically slowed down if the airspeed is approaching upper envelope limit 408 during an aft pylon (nacelle) rotation, and pylon (nacelle) rotation rate may be automatically slowed down if the airspeed is approaching lower envelope limit 410 during a forward pylon (nacelle) rotation. This may be referred to as "conversion protection," or the like.

As discussed above, pylon (nacelle) tilt control is achieved through a pylon (nacelle) thumbwheel, or the like, located on the thrust inceptor (302). Forward or aft displacement of the thumbwheel from center may command the pylons (nacelles) to rotate at a rate proportional to the displacement up to a predetermined maximum rate. The thumbwheel is used to transition between VTOL (helicopter), conversion, and cruise (airplane) mode. It is also used in VTOL mode to control pitch attitude and forward speed. For example, in a hover, the pilot may use the thumbwheel to keep the deck of the tiltrotor aircraft level, by adjusting the pitch attitude of the aircraft. Also, a pilot may try to accelerate through, or decelerate back down through, the conversion corridor. The pilot may also want to capture a particular pylon angle and fly around at a lower speed for a while, or the like. Typically, the pilot would need to manually operate the thumbwheel to maintain the pylon angle. If on the downstop in cruise (airplane) mode, the pilot may use thumbwheel to lower the rotor speed for more efficient cruise operations, or to raise the rotor speed in preparation for a deceleration when commanding the pylon off the downstop with the thumbwheel, for example. Embodiments of the present systems and methods automatically move the pylon (nacelle) and adjust rotor speed, so pilot does not have to manually use the pylon control thumbwheel on the thrust inceptor.

As noted above, a fly-by-wire flight control system (300) for an aircraft (100) may implement embodiments of the present systems and methods for automatic rotor tilt control, particularly through operation of fly-by-wire flight control system FCC(s) (306). The following description of automatic rotor tilt control will refer back to FIGS. 1 through 4 (parenthetically).

FIG. 5 is a block diagram illustrating example automatic rotor tilt control 500, according to some embodiments. FIG. 5 includes elements depicting software components, such as integrators, summation units, limiters, and switches. Automatic rotor tilt control 500 is not limited to a software implementation and can be implemented in hardware using hardware components or hardware and software components.

During cruise flight mode (and/or transition), or the like, aircraft airspeed 502 is feed into speed schedule 504. Alternatively, if an airspeed is commanded by a pilot (or aircraft flight control system (300)), commanded airspeed 506 may be selected via switch 508, and commanded airspeed 504 is feed into speed schedule 504. Speed schedule 504 converts airspeed 502 or commanded airspeed 506 into a pylon angle, which provides tilt speed command 510.

Aircraft acceleration 512 is feed through gain 514, adjusting the acceleration signal amplitude. Alternatively, if an aircraft acceleration is commanded by a pilot (or aircraft flight control system (300)), commanded acceleration 516 may be selected via switch 518, and feed through gain 514 to adjust the command amplitude. Application of gain 514 provides tilt acceleration command 520.

During VTOL flight mode (and/or conversion), such as in situations where a level flight deck is desired, pitch attitude 522 may be feed into gain 524, adjusting the pitch rate input into integrator 532. The integrator will increase or decrease until pitch attitude 522 is zero. Likewise, the pilot can use the thumbwheel to bias pitch attitude. For example, if the pilot wants to make small adjustments to hover at a different attitude than zero pitch, such as hover with the nose low so they can see over the nose of the aircraft better, the pilot can use the thumbwheel to command some pitch bias. In such circumstances, the pilot command 526 may be feed into gain 528, which is summed at 530 with the output from pitch attitude gain 524. The output from the summer 530 is a pitch rate input into integrator 532. Thus, the pilot command 526 input to the integrator can adjust the integrator to bias the pitch attitude from the nominal setting of zero pitch.

In a tiltrotor aircraft, once a point along the aircraft's conversion corridor envelope (402) is reached, where tilt bias 534 is no longer desired, switch 536 closes to activate washout path 538 such that any tilt bias command built up in integrator 528 will washout and go to zero over some amount of time.

At 540, tilt speed 510 derived from airspeed 502 or commanded airspeed 506, tilt acceleration 520 derived from acceleration 512 or commanded acceleration 516, and tilt bias 534 derived from pitch attitude 522 and any pitch attitude bias command 526 are summed to calculate tilt angle command 542. Tilt angle command 542 is compared at 544 with the current actual tilt angle 546 to calculate tilt error 548. Tilt error 548 is put through gain 550 to produce a(n) (amplitude adjusted) tilt rate command (signal) 552.

In accordance with some embodiments, conversion protection 554 may be applied if tilt rate command 552 would move the pylon outside (or within a predefined tolerance) the aircraft's conversion corridor envelope (402), such as by limiting tilt rate command 552. As a result, embodiments of the present systems and methods provide rotor tilt input similar to what a pilot would input, such as via a tiltrotor pylon thumbwheel, while maintaining automated conversion protection 554 to avoid tilt rate command 552 that would drive the pylon outside (or within a predefined tolerance) of the aircraft's conversion corridor envelope (402), or the like.

FIG. 6 is a flowchart example of automatic rotor tilt control 600, according to some embodiments of the present systems and methods. Therein, at 602 inputs are gathered or received. These inputs include: i) airspeed of the aircraft (502) or a commanded airspeed for the aircraft (506); ii) acceleration of the aircraft (512) or a commanded acceleration for the aircraft (516); iii) pitch attitude of the aircraft (522) and any pilot pitch attitude bias commands for the aircraft (526); and/or iv) an aircraft rotor (pylon) tilt angle (546). In accordance with various embodiments, aircraft mode logic may be used to select the above inputs. For example, for a tiltrotor aircraft in VTOL mode (or conversion mode), the inputs retrieved, or otherwise selected for use in accordance with embodiments of the present systems and methods, may be pitch attitude of the aircraft and pilot pitch bias commands for the aircraft. Whereas, for a tiltrotor aircraft in cruise mode, the inputs retrieved, or otherwise selected for use in accordance with embodiments of the present systems and methods, may be airspeed of the aircraft or the commanded airspeed for the aircraft and acceleration of the aircraft or a commanded acceleration for the aircraft. More particularly, airspeed and acceleration may be used, in embodiments of the present systems and methods, in all modes. For example, in cruise mode, airspeed and acceleration may be used to change rotor speed and also bring pylon off the downstop if decelerating. Commanded airspeed or acceleration may be used in accordance with embodiments of the present systems and methods if a pilot or flight control system selected aircraft response-type or mode can produce a commanded speed or acceleration from pilot inputs, otherwise actual airspeed or acceleration may be used in accordance with embodiments of the present systems and methods for calculations.

At 604, a commanded rotor tilt angle (542) for the aircraft is calculated from one or more of the airspeed of the aircraft, the commanded airspeed for the aircraft, the acceleration of the aircraft, the commanded acceleration for the aircraft, the pitch attitude of the aircraft and the pilot pitch bias commands for the aircraft. In accordance with various embodiments of the present systems and methods, for a tiltrotor aircraft in VTOL mode (or conversion mode), the pitch attitude (522) may be used to calculate the commanded rotor tilt angle (542) to maintain a deck of the aircraft level during hover. Further, airspeed and acceleration may be used to change rotor speed, and to bring pylon off of the downstop, if decelerating.

At 606, a rotor tilt angle error (548) for the aircraft is then calculated, from the (current) aircraft rotor tilt angle (546) and the calculated commanded rotor tilt angle (542), and then at 608, a rotor tilt rate command (552) for the aircraft is calculated from the rotor tilt angle error (548). Further, in accordance with various embodiments of the present systems and methods, a determination may be made whether the commanded rotor tilt angle error and/or tilt rate command is below a threshold, and if so, a deadband may be inserted in the commanded rotor tilt angle error and/or tilt rate to zero out tilt rate command when below the threshold. Additionally, or alternatively, a determination may be made whether the commanded rotor tilt angle is within a threshold of a predetermined discrete tilt angle during unaccelerated flight, and if so, logic can used to command rotor tilt angle to the predetermined discrete tilt angle.

Various elements of the present automatic rotor tilt control may be implemented as modules. Modules may be implemented in hardware. In another embodiment, modules may be expressed in software executed by hardware. In still another embodiment, modules may be implemented in firmware operated by hardware. In still other embodiments, modules may be implemented in combinations of hardware, software, and/or firmware.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for automatic rotor tilt control comprising:
   gathering or receiving, as inputs:
      airspeed of an aircraft or a commanded airspeed for the aircraft;
      acceleration of the aircraft or a commanded acceleration for the aircraft;
      pitch attitude of the aircraft and pilot pitch bias commands for the aircraft; and
      an aircraft rotor tilt angle;
   calculating, from one or more of the airspeed of the aircraft, the commanded airspeed for the aircraft, the acceleration of the aircraft, the commanded acceleration for the aircraft, the pitch attitude of the aircraft and the pilot pitch bias commands for the aircraft, a commanded rotor tilt angle for the aircraft;
   calculating, from the aircraft rotor tilt angle and the commanded rotor tilt angle, a rotor tilt angle error for the aircraft;
   calculating, from the rotor tilt angle error, a rotor tilt rate command for the aircraft; and
   at least one of:
      determining if the commanded rotor tilt angle is within a threshold of a predetermined discrete tilt angle during unaccelerated flight, and commanding the rotor tilt angle to the predetermined discrete tilt angle in response to the commanded rotor tilt angle being within the threshold of the predetermined discrete tilt angle during unaccelerated flight; and
      determining if the commanded rotor tilt angle error and/or tilt rate command is below a threshold, and inserting a deadband in the commanded rotor tilt angle error and/or tilt rate, to zero out tilt rate command in response to the commanded rotor tilt angle error and/or tilt rate command being below the threshold.

2. The method of claim 1, further comprising using aircraft mode logic to select as inputs:
   i) the airspeed of the aircraft or the commanded airspeed for the aircraft;
   ii) the acceleration of the aircraft or the commanded acceleration for the aircraft; and/or
   iii) the pitch attitude of the aircraft and the pilot pitch bias commands for the aircraft.

3. The method of claim 2, wherein the aircraft is a tiltrotor aircraft and the mode is a vertical take-off and landing mode, conversion mode, or a cruise mode and the inputs selected in vertical take-off and landing mode are airspeed of the aircraft or the commanded airspeed for the aircraft and acceleration of the aircraft or a commanded acceleration for the aircraft, pitch attitude of the aircraft and pilot pitch bias commands for the aircraft, and the inputs selected in cruise mode are airspeed of the aircraft or the commanded airspeed for the aircraft and acceleration of the aircraft or a commanded acceleration for the aircraft.

4. The method of claim 2, wherein the mode is the vertical take-off and landing mode, and the pitch attitude is used to calculate the commanded rotor tilt angle to maintain a deck of the aircraft level during hover.

5. The method of claim 2, wherein the mode is the vertical take-off and landing mode, and the pilot pitch bias commands for the aircraft are used to calculate the commanded rotor tilt angle to maintain a deck of the aircraft according to the pilot pitch bias commands for the aircraft during hover.

6. The method of claim 3, wherein the mode is vertical take-off and landing mode, conversion mode, or a cruise mode and the airspeed of the aircraft or the commanded airspeed for the aircraft and acceleration of the aircraft or a commanded acceleration for the aircraft is used to calculate the commanded rotor tilt angle.

7. The method of claim 1, wherein the rotor comprises a tilting rotating thrust device.

8. An aircraft flight control system comprising:
an aircraft flight control computer configured to:
gather or receive, as inputs:
airspeed of an aircraft or a commanded airspeed for the aircraft;
acceleration of the aircraft or a commanded acceleration for the aircraft;
pitch attitude of the aircraft and pilot pitch bias commands for the aircraft; and
an aircraft rotor tilt angle;
calculate, from one or more of the airspeed of the aircraft, the commanded airspeed for the aircraft, the acceleration of the aircraft, the commanded acceleration for the aircraft, the pitch attitude of the aircraft and the pilot pitch bias commands for the aircraft, a commanded rotor tilt angle for the aircraft;
calculate, from the aircraft rotor tilt angle and the commanded rotor tilt angle, a rotor tilt angle error for the aircraft;
calculate, from the rotor tilt angle error, a rotor tilt rate command for the aircraft;
at least one of:
determine if the commanded rotor tilt angle is within a threshold of a predetermined discrete tilt angle during unaccelerated flight and command the rotor tilt angle to the predetermined discrete tilt angle in response to the commanded rotor tilt angle being within the threshold of the predetermined discrete tilt angle during unaccelerated flight; and
determine if the commanded rotor tilt angle error and/or tilt rate command is below a threshold and insert a deadband in the commanded rotor tilt angle error and/or tilt rate to zero out tilt rate command in response to the commanded rotor tilt angle error and/or tilt rate command being below the threshold; and
output the rotor tilt rate command to one or more aircraft flight control element actuators to tilt the aircraft rotor.

9. The aircraft flight control system of claim 8, wherein the aircraft flight control computer is further configured to use aircraft mode logic to select as inputs:
i) the airspeed of the aircraft or the commanded airspeed for the aircraft;
ii) the acceleration of the aircraft or the commanded acceleration for the aircraft; and/or
iii) the pitch attitude of the aircraft and the pilot pitch bias commands for the aircraft.

10. The aircraft flight control system of claim 9, wherein the aircraft is a tiltrotor aircraft and the mode is a vertical take-off and landing mode, conversion mode, or a cruise mode and the inputs selected in vertical take-off and landing mode are airspeed of the aircraft or the commanded airspeed for the aircraft and acceleration of the aircraft or a commanded acceleration for the aircraft, pitch attitude of the aircraft and pilot pitch bias commands for the aircraft, and the inputs selected in cruise mode are airspeed of the aircraft or the commanded airspeed for the aircraft and acceleration of the aircraft or a commanded acceleration for the aircraft.

11. The aircraft flight control system of claim 9, wherein the mode is the vertical take-off and landing mode, and the pitch attitude is used to calculate the commanded rotor tilt angle to maintain a deck of the aircraft level during hover.

12. The aircraft flight control system of claim 9, wherein the mode is vertical take-off and landing mode, conversion mode, or cruise mode and the airspeed of the aircraft or the commanded airspeed for the aircraft and acceleration of the aircraft or a commanded acceleration for the aircraft is used to calculate the commanded rotor tilt angle.

13. The aircraft flight control system of claim 9, wherein the mode is the vertical take-off and landing mode, and the pilot pitch bias commands for the aircraft are used to calculate the commanded rotor tilt angle to maintain a deck of the aircraft according to the pilot pitch bias commands for the aircraft during hover.

14. A tiltrotor aircraft, comprising:
a fuselage;
a wing attached to the fuselage;
a rotor system coupled to the wing and configured to move between a horizontal position and a vertical position during operation, the rotor system comprising rotor blades, the rotor system operable to generate thrust when rotating; and
an aircraft flight control computer configured to:
gather or receive, as inputs:
airspeed of the aircraft or a commanded airspeed for the aircraft;
acceleration of the aircraft or a commanded acceleration for the aircraft;
pitch attitude of the aircraft and pilot pitch bias commands for the aircraft; and
an aircraft rotor tilt angle;
calculate, from one or more of the airspeed of the aircraft, the commanded airspeed for the aircraft, the acceleration of the aircraft, the commanded acceleration for the aircraft, the pitch attitude of the aircraft and the pilot pitch bias commands for the aircraft, a commanded rotor tilt angle for the aircraft;
calculate, from the aircraft rotor tilt angle and the commanded rotor tilt angle, a rotor tilt angle error for the aircraft;
calculate, from the rotor tilt angle error, a rotor tilt rate command for the aircraft;
at least one of:
determine if the commanded rotor tilt angle is within a threshold of a predetermined discrete tilt angle during unaccelerated flight and command the rotor tilt angle to the predetermined discrete tilt angle in response to the commanded rotor tilt angle being within the threshold of the predetermined discrete tilt angle during unaccelerated flight; and
determine if the commanded rotor tilt angle error and/or tilt rate command is below a threshold and insert a deadband in the commanded rotor tilt angle error and/or tilt rate to zero out tilt rate command in response to the commanded rotor tilt angle error and/or tilt rate command being below the threshold; and output the rotor tilt rate command to one or more aircraft flight control element actuators to tilt the rotor system.

15. The tiltrotor aircraft of claim 14, wherein the aircraft flight control computer is further configured to use aircraft mode logic to select as inputs:
   i) the airspeed of the aircraft or the commanded airspeed for the aircraft;
   ii) the acceleration of the aircraft or the commanded acceleration for the aircraft; and/or
   iii) the pitch attitude of the aircraft and the pilot pitch bias commands for the aircraft.

16. The tiltrotor aircraft of claim 15, wherein the aircraft is a tiltrotor aircraft and the mode is a vertical take-off and landing mode, conversion mode, or a cruise mode and the inputs selected in vertical take-off and landing mode are airspeed of the aircraft or the commanded airspeed for the aircraft and acceleration of the aircraft or a commanded acceleration for the aircraft, pitch attitude of the aircraft and pilot pitch bias commands for the aircraft, and the inputs selected in cruise mode are airspeed of the aircraft or the commanded airspeed for the aircraft and acceleration of the aircraft or a commanded acceleration for the aircraft.

17. The tiltrotor aircraft of claim 15, wherein, when the tiltrotor aircraft is in the vertical take-off and landing mode the pitch attitude is used to calculate the commanded rotor tilt angle to maintain a deck of the aircraft level during hover.

18. The tiltrotor aircraft of claim 15, wherein, when the tiltrotor aircraft is in the cruise mode, the airspeed of the aircraft or the commanded airspeed for the aircraft and acceleration of the aircraft or the commanded acceleration for the aircraft is used to calculate the commanded rotor tilt angle.

19. The tiltrotor aircraft of claim 15, wherein, when the tiltrotor aircraft is in the vertical take-off and landing mode, the pilot pitch bias commands for the aircraft are used to calculate the commanded rotor tilt angle to maintain a deck of the aircraft according to the pilot pitch bias commands for the aircraft during hover.

* * * * *